United States Patent [19]

Ruimi

[11] Patent Number: 5,507,205
[45] Date of Patent: Apr. 16, 1996

[54] HAT SHAPED BACK PACK STEERING WHEEL COVER

[75] Inventor: Avi Ruimi, Tarzana, Calif.

[73] Assignee: Auto-Shade, Inc., Moorpark, Calif.

[21] Appl. No.: 240,844

[22] Filed: May 11, 1994

[51] Int. Cl.⁶ .................. B62D 1/06; A42B 1/00
[52] U.S. Cl. .......... 74/558; 74/558.5; 2/209.12; 2/195.1; 2/195.3; 2/209.11
[58] Field of Search .............. 2/195.1–195.3, 2/209.11, 209.12; D2/885, 865, 867; 74/558, 558.5

[56] References Cited

U.S. PATENT DOCUMENTS

| 442,921 | 12/1890 | Stohr | 2/195.1 |
|---|---|---|---|
| 529,119 | 11/1894 | Frank | 2/195.1 |
| 661,509 | 11/1900 | Fogg | 2/195.1 |
| 1,337,397 | 4/1920 | Fischer | 2/195.3 |
| 1,361,289 | 12/1920 | Rosenzweig | 2/209.12 |
| 1,571,107 | 1/1926 | Capelle et al. | 2/209.12 |
| 2,597,447 | 5/1952 | Bruns | 2/209.12 |
| 2,686,919 | 8/1954 | Schlesinger | 2/209.12 |
| 4,472,837 | 9/1984 | Saxton | 2/195.1 |
| 4,556,993 | 12/1985 | Okamura | 2/209.12 |

FOREIGN PATENT DOCUMENTS

| 1049740 | 12/1953 | France | 2/209.11 |
|---|---|---|---|
| 866395 | 2/1953 | Germany | 2/209.11 |
| 95767 | 5/1939 | Sweden | 2/195.1 |
| 2240029 | 7/1991 | United Kingdom | 2/195.1 |

Primary Examiner—Vinh T. Luong
Attorney, Agent, or Firm—Blakely Sokoloff Taylor & Zafman

[57] ABSTRACT

A hat shaped cover for a steering wheel. The hat has a brim that extends from a crown. The crown has an inner compartment which allows the user to store and carry items therein. The hat shaped wheel cover also has a pair of straps that allow the user to carry the cover like a backpack. The straps are adjustable and adapted to be placed around the steering wheel so that the crown can cover the wheel to protect the same from sunlight and heat. The hat shaped cover has a removable lid that allows the end user to insert an inner-tube into the inner crown compartment and wear the cover as a hat.

2 Claims, 2 Drawing Sheets

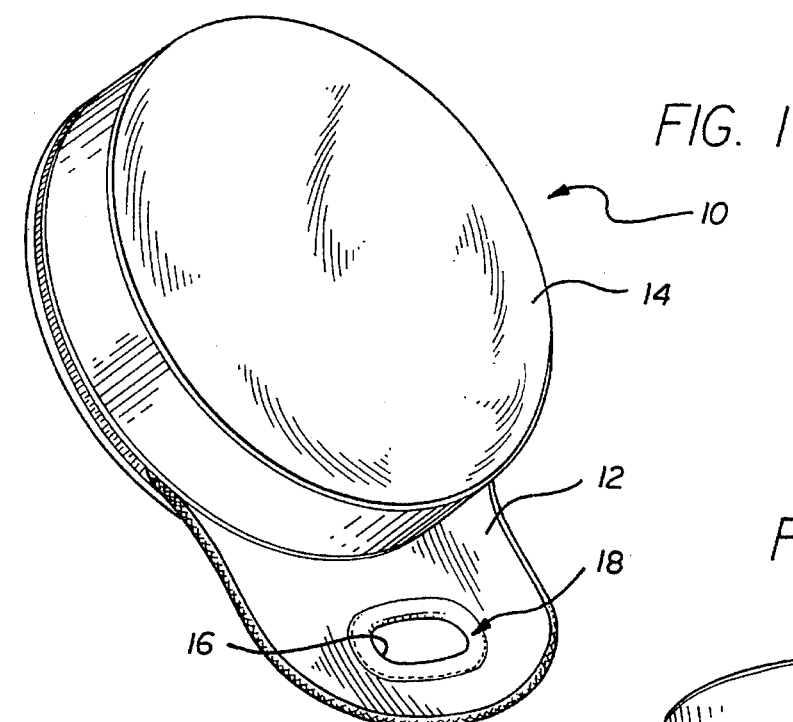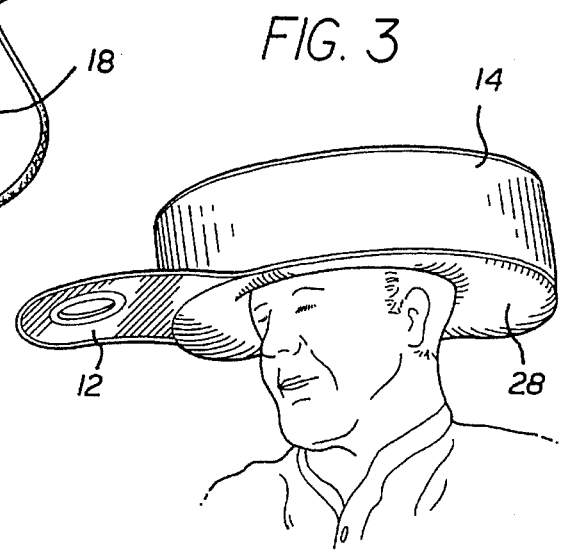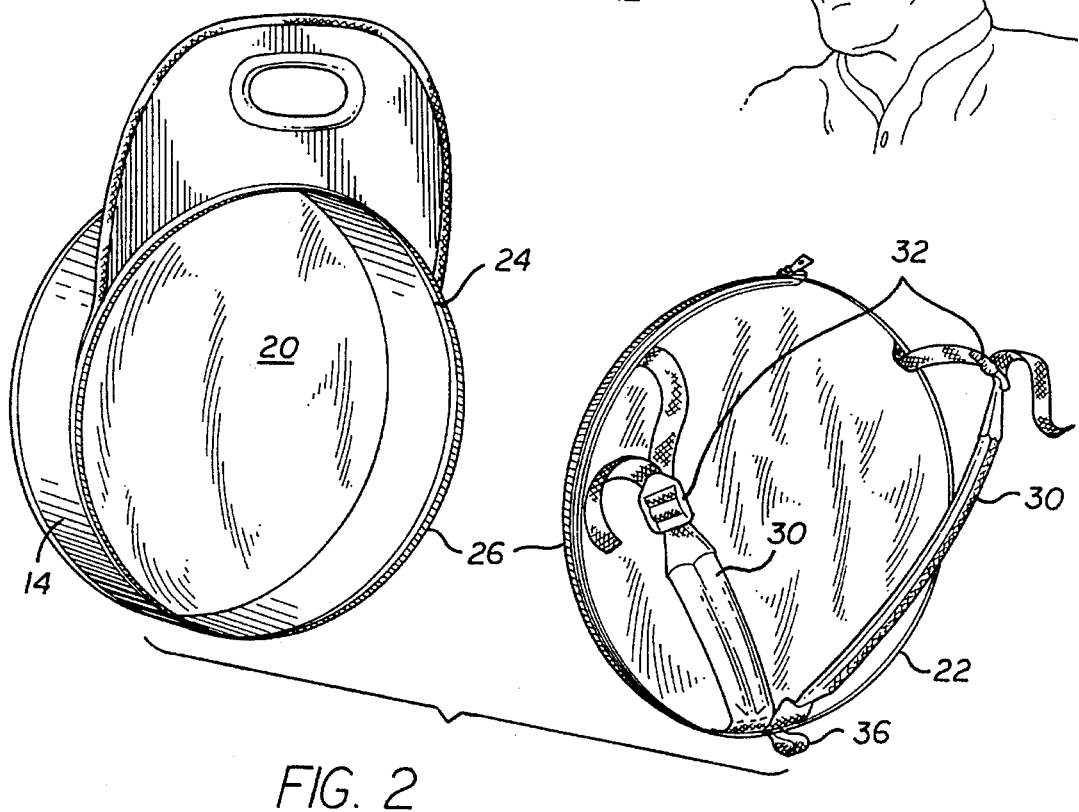

HAT SHAPED BACK PACK STEERING WHEEL COVER

BACKGROUND OF THE INVENTION

1. Field of the Invention

The present invention relates to a multi-functional steering wheel cover.

2. Description of the Related Art

The temperature of the interior of an automobile may become elevated when the car is exposed to sunlight or a hot ambient. The heated passenger compartment may increase the temperature of the steering wheel. A hot steering wheel is uncomfortable to operate. Additionally, the sunlight may cause the material of the steering wheel and the dashboard to fade. It would therefore be desirable to have a cover that can be readily attached and removed from the steering wheel of an automobile. It would also be desirable to have a steering wheel cover that has functions in addition to covering the steering wheel. By way of example, it would be desirable if the wheel cover could store and carry items within an inner compartment of the cover. Finally, it would be desirable to provide a novelty steering wheel cover that is visually entertaining and fun to use.

SUMMARY OF THE INVENTION

The present invention is a hat shaped cover for a steering wheel. The hat has a brim that extends from a crown. The crown has an inner compartment which allows the user to store and carry items therein. The hat shaped wheel cover, also has a pair of straps that allow the user to carry the cover and use the cover as a backpack. The straps are adjustable and adapted to be placed around the steering wheel so that the crown can cover the wheel to protect the same from sunlight and heat. The hat shaped cover has a removable lid that allows the end user to insert an inner-tube into the inner crown compartment and wear the cover as a hat.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a hat shaped wheel cover of the present invention;

FIG. 2 is an exploded view of the hat shaped wheel cover;

FIG. 3 is a perspective view of the wheel cover worn as a hat;

DETAILED DESCRIPTION OF THE INVENTION

Figure 4A:
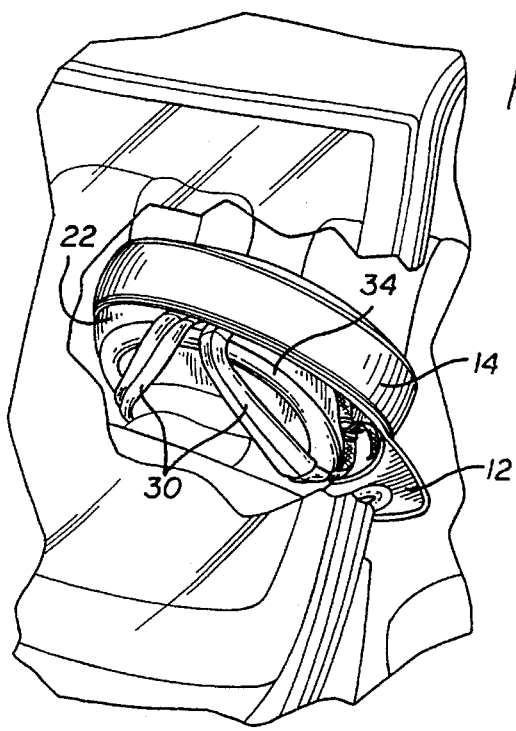
FIG. 4A is a rear perspective view of the hat shaped wheel cover attached to a steering wheel.

Referring to the drawings more particularly by reference numbers, FIGS. 1 and 2 show a hat shaped steering wheel cover 10 of the present invention. The cover 10 is typically constructed from a fabric, vinyl or any other flexible garment material. The hat 10 includes a brim 12 that extends from a crown 14. The brim 12 may have a slot 16 which creates a handle 18 that allows the user to more readily carry the cover 10.

The crown 14 may have an inner compartment 20 large enough to store items so that the cover 10 can also be used as a bag. The inner compartment 20 may be enclosed by a lid 22 which is attached to the outer lip 24 of the crown 14 by a zipper 26. The zipper 26 extends around the entire periphery of the crown 14 so that the lid 22 can be removed from the hat 10. As shown in FIG. 3, once the lid 22 is removed, an inner-tube 28 can be inserted into the inner compartment 20 so that the cover 10 can be worn as a hat. The ability to convert the cover 10 into a hat provides a novelty feature that increase the entertainment value of the device.

Figure 4B:
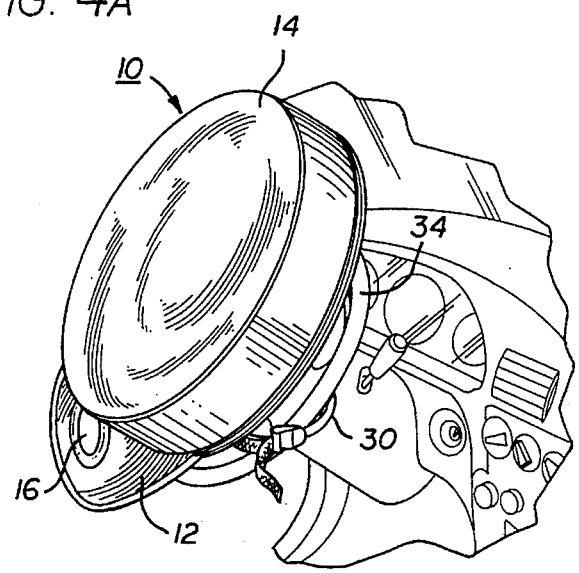
FIG. 4B is a front perspective view of the hat shaped wheel cover attached to a steering wheel.
Figure 5:
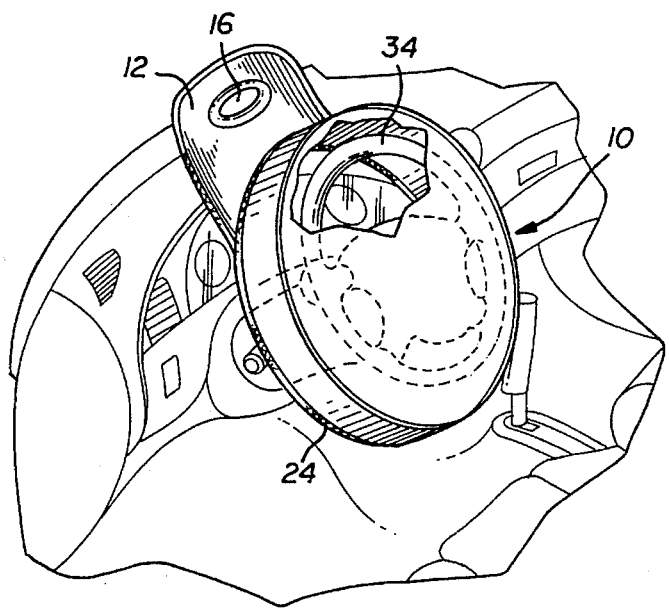
FIG. 5 is a perspective view of an alternate method of attaching the hat shaped wheel cover to a steering wheel.

Attached to the lid 22 are a pair of straps 30. The straps 30 each have buckles 32 that allow the user to vary the length of the straps 30. As shown in FIGS. 4A and 4B, the straps 30 can be placed around the steering wheel 34 of an automobile so that the crown 14 covers the wheel 34. The crown 14 will prevent sunlight from directly impinging the steering wheel 34, thereby preventing the material of the steering wheel from becoming heated or faded from the light. As shown in FIG. 5, the cover 10 can also be attached to the steering wheel 34 by removing the lid 22 and placing the outer lip 24 around the edge of the steering wheel 34. The brim 12 may extend over the dashboard of the automobile to cover the same.

Figure 6:
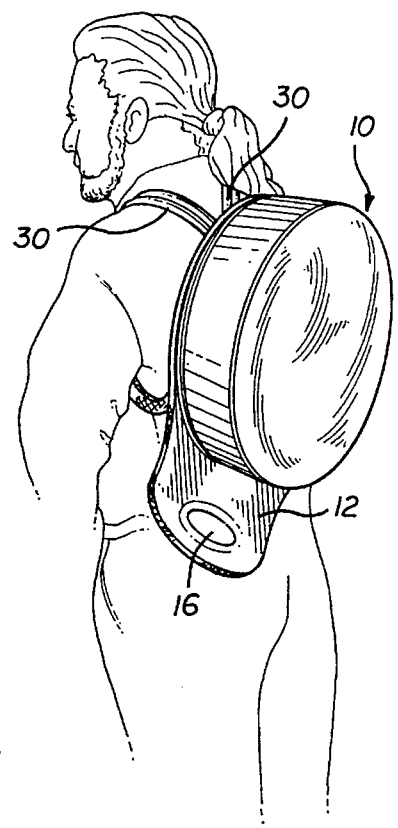
FIG. 6 is a perspective view of the hat shaped wheel cover worn as a backpack.

As shown in FIG. 6, the straps 30 also allow the cover 10 to be worn like a backpack. The user can thus carry items stored in the inner compartment 20 of the cover 10, and then store the items within the car by placing the cover 10 on the steering wheel 34. The lid 22 may also have a tab 36 that allows the cover 10 to be hung from a rack (not shown). The present invention provides a device that can readily cover a steering wheel, store and carry items, and be worn as a hat to provide a certain amount of amusement for the user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hat shaped cover comprising:

a crown that has an outer lip that defines an inner compartment, wherein said outer lip is shaped to fit around a steering wheel;

a brim that extends from said crown, wherein said brim has a slot;

a lid that encloses said inner compartment;

a zipper that attaches said lid to said outer lip; and a pair of straps attached to said lid, wherein said straps have buckles which allow a user to vary the length of the straps.

2. The hat shaped cover as recited in claim 1, further comprising an inner-tube that is inserted into said inner compartment so that said cover can be worn as a hat.

\* \* \* \* \*